United States Patent [19]
Siefert

[11] Patent Number: 5,701,452
[45] Date of Patent: Dec. 23, 1997

[54] COMPUTER GENERATED STRUCTURE

[75] Inventor: David M. Siefert, Englewood, Ohio

[73] Assignee: NCR Corporation, Dayton, Ohio

[21] Appl. No.: 425,164

[22] Filed: Apr. 20, 1995

[51] Int. Cl.$^6$ ................................................ G06F 17/30
[52] U.S. Cl. .................... 395/601; 395/604; 395/612; 395/616; 395/200.01; 395/334; 395/552; 395/712
[58] Field of Search ........................ 395/600, 700, 395/650, 155, 601, 604, 612, 200.01, 552, 334, 712, 616; 364/419

[56] References Cited

U.S. PATENT DOCUMENTS

| | | | |
|---|---|---|---|
| 5,111,398 | 5/1992 | Nunberg et al. | 364/419 |
| 5,361,393 | 11/1994 | Rossillo | 395/650 |
| 5,412,772 | 5/1995 | Monson | 395/155 |
| 5,414,838 | 5/1995 | Kolton et al. | 395/600 |
| 5,432,937 | 7/1995 | Tevanian et al. | 395/700 |

OTHER PUBLICATIONS

Ghim Hwee Ong et al., "Compression of Chinese Text Files Using a Multiple Four-Bit Coding Scheme", IEEE pp. 1062-1066, 1992.

Primary Examiner—Thomas G. Black
Assistant Examiner—Cheryl R. Lewis

[57] ABSTRACT

The invention concerns a file structure for a computer file. A computer file normally contains (a) a system header, (b) a header generated by an application program, and (c) information generated by a user. The invention creates information in addition to these three types, and adds it to the file. This added information is used by other programs, to transform the data, prior to presentation to the user.

24 Claims, 6 Drawing Sheets

FIG. 1

```
5768656E 20627579 696E6720 636F636F 6E757473 2C206D61   When buying coconuts, ma
6B652073 75726574 68617420 74686579 20617265 20637261   ke surethat they are cra
636B2D66 72656520 616E6420 68617665 0D0A6E6F 206D6F6C   ck-free and have no  mol
64206F6E 20746865 6D2E2020 5368616B 65207468 656D2074   d on them.  Shake them t
6F206D61 6B652073 75726520 74686174 20746865 79206172   o make sure that they ar
65206865 61767920 77697468 0D0A7761 7465722E 20204E6F   e heavy with  water.  No
7720686F 6C642063 6F636F6E 75742069 6E206F6E 65206861   w hold coconut in one ha
6E64206F 76657220 61207369 6E6B2061 6E642068 69742069   nd over a sink and hit i
74206172 6F756E64 0D0A7468 65206365 6E746572 20776974   t around  the center wit
68207468 6520636C 61772065 6E64206F 66206120 68616D6D   h the claw end of a hamm
65722E                                                  er.
```

— HEXADECIMAL REPRESENTATION

FIG. 2

HEADER

```
FF575043 3D010000 010A0000 00000000 FBFF0500 32000901 .WPC=.. ......«..2.
00000700 12000000 42000000 02005600 00005400 00000C00 ......B....V...T... .¤
57000000 AA000000 06000800 00000101 0000436F 75726965 W...^........Courie¤
72203130 20706974 6368004B 0000FFFF 7A004E00 78007800 r 10 pitch.K....z.N.x.x.
78002C01 01000000 0000F401 E996F401 7800141E 0C178C0A x.,.....¶ô¶x.  ¤
00000004 1140C900 A7CDC701 3B00FEFE FEFEFEFE FEFFFFFF ...@è.Ïëú;.±±±±±±...¤
FFFFFEFF FFFEFFFF FFFFFFFF FFFFFFFF FFFFFFFF FFFFFFFE ..±..±.................±
FFFF4850 204C6173 65724A65 74205365 72696573 20494900 ..HP LaserJet Series II.
00000000 00000000 00000000 00000048 504C4153 4549492E ..............HPLASEII.
50525300 DB017800 141E0C17 8C0A0000 00041140 C90087CF PRS.Üx.  ...@è.ü¤
01000100 2C01F000 F0006801 30361AE6 6300237C 00780000 ..,Þ.Þ.h06Ìc.#|.x..¤
00FBFF05 00320000 00000008 00020000 003B0100 00000000 .«..2........;.....¤
00000000 00000000 00000000 00000000 00000000 00000000 ....................
00000000 00576865 6E206275 79696E67 20636F63 6F6E7574 .....When buying coconut
732C206D 616B6520 73757265 74686174 20746865 79206172 s, make surethat they ar
65206372 61636B2D 66726565 20616E64 20686176 650D0A6E e crack-free and have  n
6F206D6F 6C64206F 6E207468 656D2E20 20536861 6B652074 o mold on them.  Shake t
68656D20 746F206D 616B6520 73757265 20746861 74207468 hem to make sure that th
65792061 72652068 65617679 20776974 680D0A77 61746572 ey are heavy with  water
2E20204E 6F772068 6F6C6420 636F636F 6E757420 696E206F .  Now hold coconut in o
6E652068 616E6420 6F766572 20612073 696E6B20 616E6420 ne hand over a sink and
68697420 69742061                                     hit it a
```

COMPUTER GENERATED STRUCTURE

RELATED APPLICATIONS

Ser. No. 08/217,062, entitled "Ordering and Downloading Resources from Computerized Repositories," in which David Siefert is the Inventor, filed on Mar. 24, 1994.

Ser. No. 08/217,063, entitled "Automated Updating of Computer Software," in which David Siefert is the Inventor, filed on Mar. 24, 1994.

Ser. No. 08/217,065, entitled "Automated Resources Management System," in which David Siefert is the inventor, filed on Mar. 24, 1994.

Ser. No. 08/217,066, entitled "Future Boolean Searching of Multiple Repositories of Resources," in which David Siefert is the Inventor, filed on Mar. 24, 1994.

Ser. No. 08/217,067, entitled "Security Aspects of Computer Resource Repositories," in which David Siefert is the Inventor, filed on Mar. 24, 1994.

Ser. No. 08/217,422, entitled "Launching Computer Program Upon Download of Data Created by Program," in which David Siefert is the Inventor, filed on Mar. 24, 1994.

Ser. No. 08/217,476, entitled "Computer System for Management of Resources," in which David Siefert is the Inventor, filed on Mar. 24, 1994.

Ser. No. 08/218,024, entitled "Multiple Repositories of Computer Resources, Transparent to User," in which David Siefert is the Inventor, filed on Mar. 24, 1994.

These applications are hereby incorporated by reference.

The invention concerns associating specific types of information with a computer-readable file. The information describes certain characteristics of the file. These characteristics are needed by apparatus, such as computer programs, which process the file.

BACKGROUND OF THE INVENTION

Computer software generates files, which generally take the form of digital representations of information. For example, when a user stores a document using word-processing software, a file is generated, which contains the document.

The software generally adds a "header" to the document itself. An example will illustrate.

Assume that a user generates the following document:

When buying coconuts, make sure that they are crack-free and have no mold on them. Shake them to make sure that they are heavy with water. Now hold coconut in one hand over a sink and hit it around the center with the claw end of a hammer.

When this document is stored as a binary file, each character (ie, the "W", "h", "e", "n", and so on) is assigned an eight-bit code. One type of assignment is shown in FIG. 1, which illustrates a version of ASCII code. (As stated above, the file is generally stored in binary format. Hexadecimal, not binary, representation is used in FIG. 1, for simplicity.)

When this file is stored in the normal manner by a word-processing program, a header is added, as shown in FIG. 2. The particular header shown was added by the software package known as WordPerfect, available from WordPerfect Corporation, Orem, Utah. The header contains data such as the following:

Identification of the generating software ("WPC" in the header);

Identification of the printer selected by the user during generation of the document ("HP LaserJet Series II");

Identification of the font selected by the user ("Courier");

Identification of the pitch of the font ("10 pitch"); as well as other information.

Therefore, from one perspective, a computer file contains two types of information: (1) data created by the user and (2) header information, created by software operated by the user. The Inventor proposes that additional information be added to the file, in order to accommodate file transfer, translation, and other processing.

OBJECTS OF THE INVENTION

An object of the invention is to provide a file structure which contains information which can be used by apparatus which processes the file.

SUMMARY OF THE INVENTION

In one form of the invention, blocks of specific information are stored with a computer file. The information can include the following: Natural language of the file (eg., English or French); type of encryption of the file; type of compression of the file; identity of the program which generated the file; identity of the system which generated the file; and communication protocols.

BRIEF DESCRIPTION OF THE DRAWINGS

FIG. 1 illustrates a hex dump of a text file, together with hex character equivalents.

FIG. 2 illustrates a hex dump of a word-processing file, together with hex character equivalents.

DETAILED DESCRIPTION OF THE INVENTION

Figure 3:
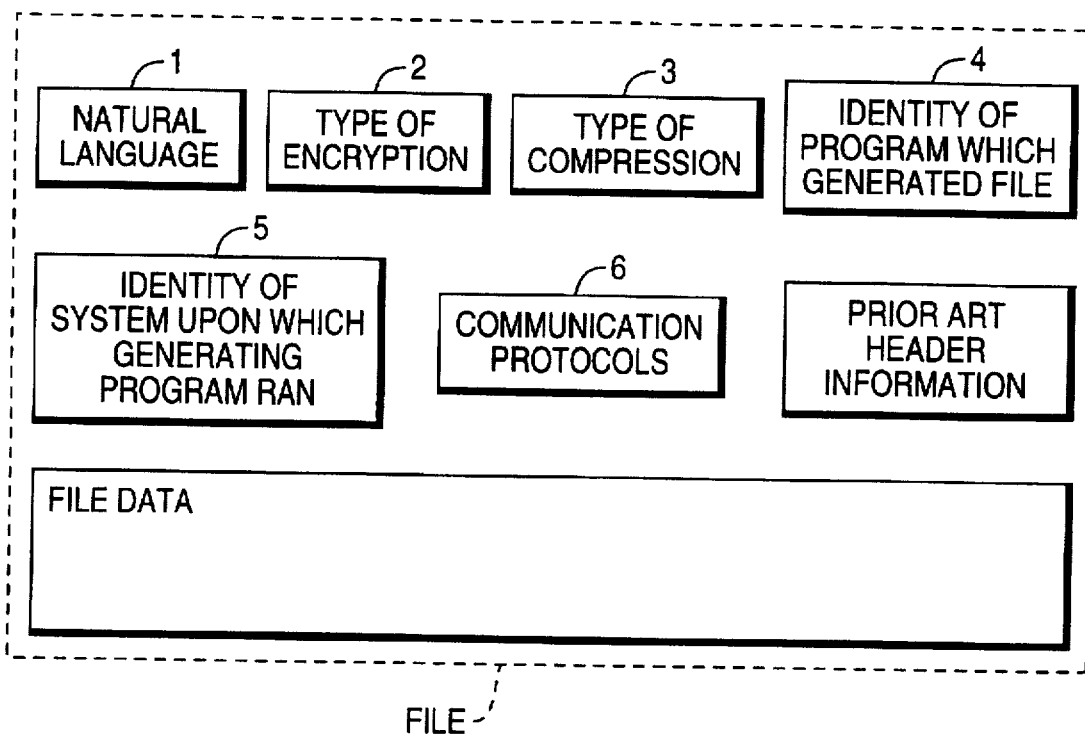
FIG. 3 illustrates one form of the invention.

FIG. 3 shows one form of the invention. Six blocks, labeled 1 through 6, have been added to a normal, prior-art file, which includes two components: (1) PRIOR ART HEADER INFORMATION and (2) FILE DATA (also called user data).

The PRIOR ART HEADER INFORMATION corresponds, in principle, to the header shown in FIG. 2, and is generated by the software used to create the file. The user of the software, in general, is not involved with, and is not interested in, this HEADER.

The FILE DATA contains the information generated by the user, such as the phrase "When buying coconuts . . ." indicated in FIG. 2. The FILE DATA is the information generated by the user.

For example, in the case of a word-processing program, the FILE DATA corresponds to the document generated by the user. As another example, in the case of a drafting program, the FILE DATA corresponds to the drawing generated by the user.

(In practice, a "system header" is also created, but is not shown. The system header is generated by, and used by, the operating system, which is the physical agent which actually writes the bits, which make up the file, onto disc.)

Six Types of Added Information

The six added blocks of FIG. 3 contain the following information. Block 1 contains information as to the natural language, if any, of the FILE DATA. Natural language refers to a human language, such as English or French, rather than another type of language, such as FORTRAN.

Block 2 contains information about the type of encryption, if any, which the FILE DATA has experienced, or should experience.

Block 3 contains information about the type of compression, if any, which the FILE data has experienced, or should experience.

Block 4 contains information about the identity of the program which generated the FILE DATA, such as the name of the particular program generating the file, and the release number, or version number, of the program. (Programs continually undergo revision, and the revisions themselves are continually revised.)

Block 5 contains information about the system upon which the generating program, identified in block 4, ran. Examples of different systems are McIntosh, IBM PC, Sun Workstation, Unix, etc. This information is relevant to the system header, discussed below. Block 5 may also contain information about the operating system upon which the generating program ran, such as DOS version 6.0.

Block 6 contains information needed by communication protocols, which may be used subsequently to transmit the file electronically from one location to another. As an example, some communications protocols transmit only seven-bit information. With such protocols, eight-bit data, such as compiled computer programs and some type of bit-mapped data, cannot be transmitted. Block 6 in FIG. 3 would indicate the type of data (eight-bit or seven-bit) contained in the file, and thus indicate which protocols are needed.

Some examples of protocols are the commercial standards ISDN, TCP/IP, and ATM.

How Six Types are Used

Figure 4:
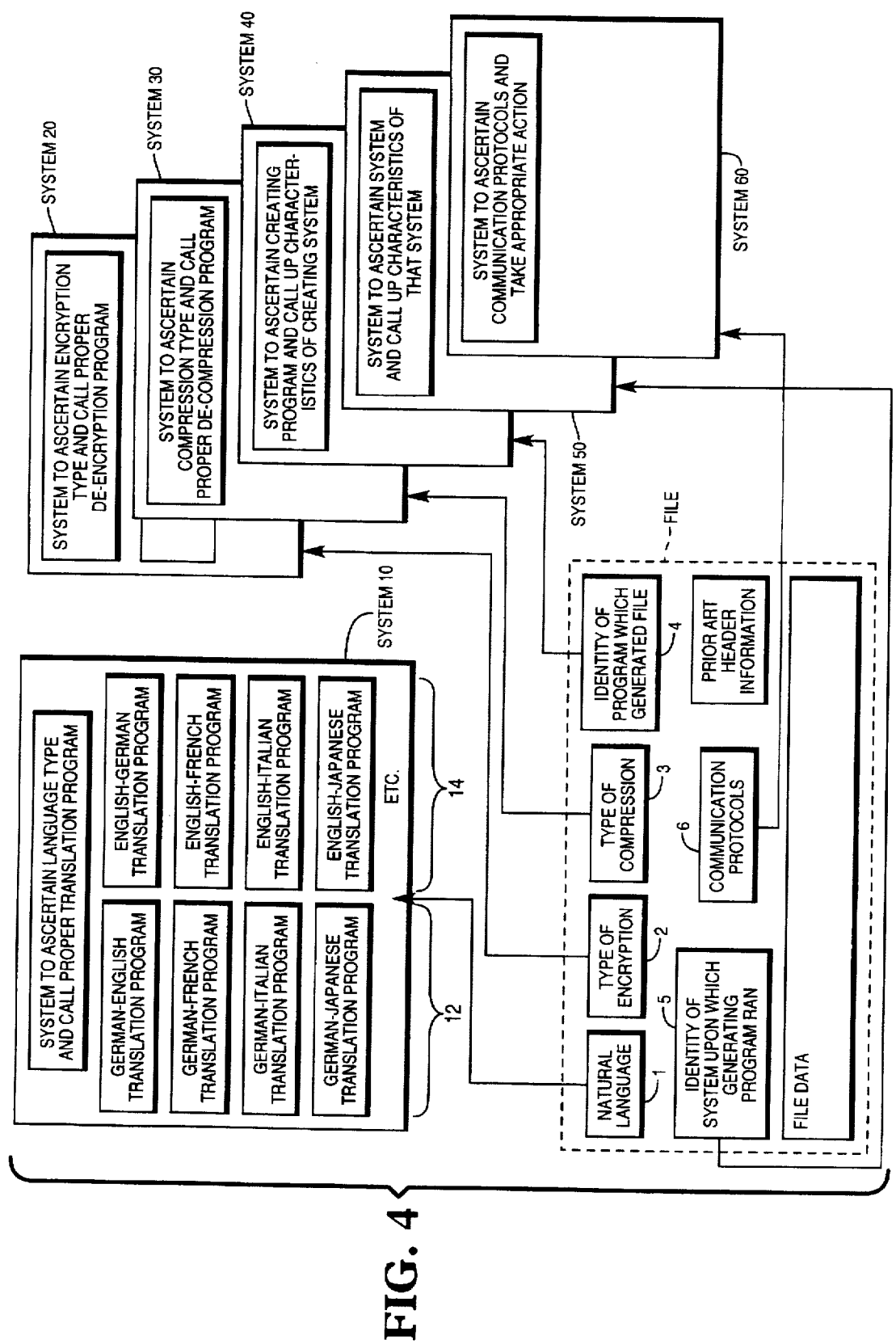
FIG. 4 illustrates apparatus which can use the information shown in FIG. 3 for processing the FILE DATA.

The information contained within the six blocks is used by the systems shown in FIG. 4. System 10 reads block 1, and calls an appropriate language translation program. For example, if the language indicated in block 1 is German, then system 10 knows that one of the translation programs in group 12 will be used. The translation will be from German, to another language. If the language is English, then system 10 knows that one of the translation programs in group 14 will be used. (The particular program in each group which will be selected will depend upon the language into which the file is to be translated, and is not a concern of the present invention.)

System 20 reads the information of block 2, and calls an appropriate encryption, or de-encryption, program.

System 30 reads the information of block 3, and calls an appropriate compression, or de-compression, program.

System 40 reads the information of block 4, and calls an appropriate table which contains relevant characteristics of the generating program. For example, if the generating program is WordPerfect, system 40 calls a table containing information needed to translate, or use, the header information shown in FIG. 2.

System 50 reads the information of block 5, and calls an appropriate table which contains relevant characteristics of the system upon which the generating program ran. This table contains, among other things, information about the system header of the file.

System 60 reads the information of block 6, and responds appropriately.

How to Store the Six Types of Data

How the data of the six blocks is associated with the prior-art file (ie, the FILE DATA and PRIOR ART HEADER INFORMATION of FIG. 3) will now be discussed.

First Approach

Figure 5:
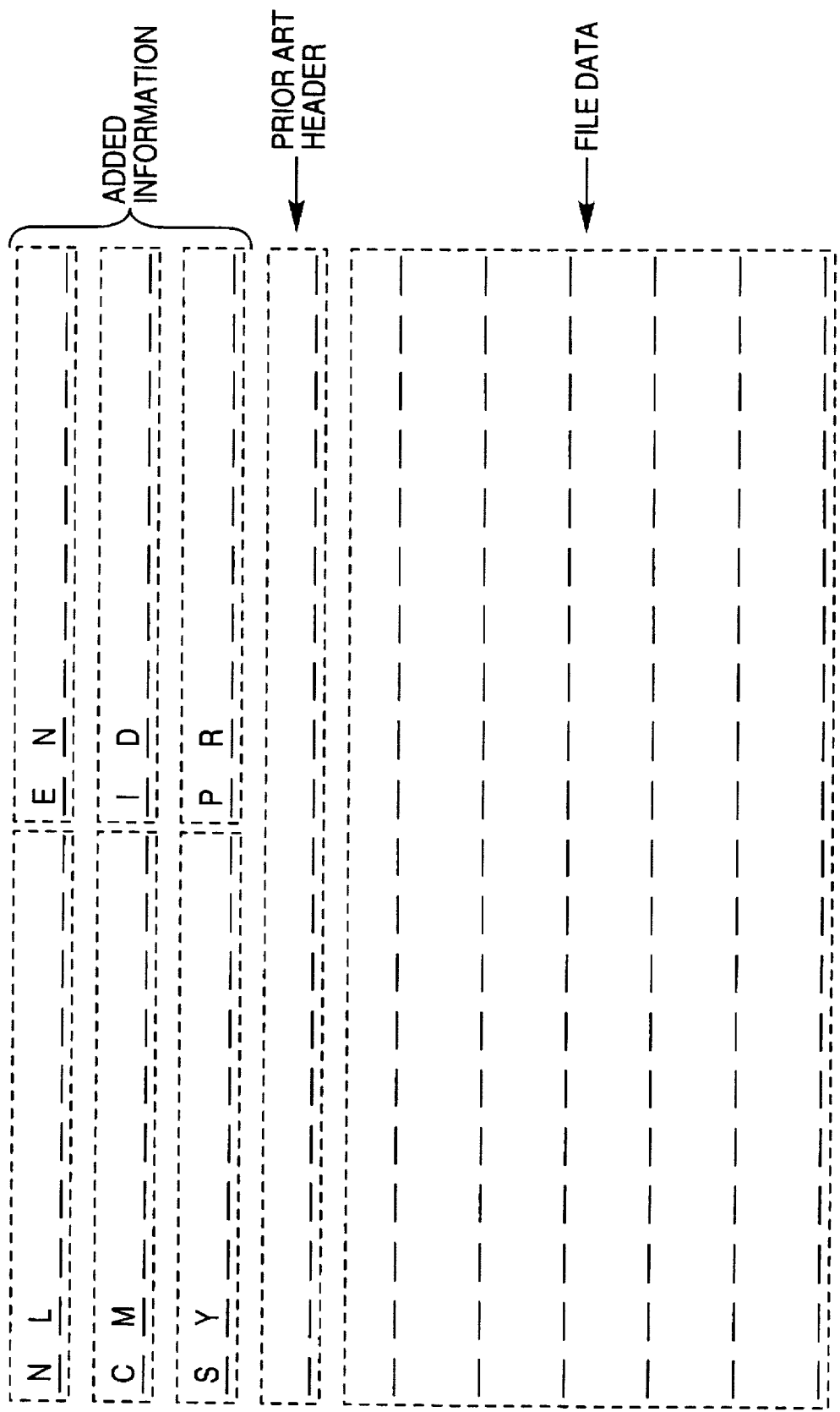
FIG. 5 illustrates how certain information of FIG. 3 can be stored physically within a file.

The six blocks can be added to a file as shown in FIG. 5, which shows six added fields, labeled ADDED INFORMATION. Each horizontal line in the fields indicates one character. Each field may be identified by a code, such as NL for Natural Language, EN for Encryption, and so on.

However, it is possible that adding information to the header of a file in this manner will disrupt operation of the generating program. For example, a word-processing program may expect a specific number, and type, of fields within the HEADER. If the program sees added fields, it may not recognize the file, and issue an error warning.

Consequently, after the six fields have been added, it is possible that programs intended to retrieve and process the FILE DATA must be specifically re-designed to negotiate the six added fields. Designing programs to accomplish this is within normal programmer's skill, but it is possible that many existing programs are not so designed. It is also possible that software developers may be resistant to undertake such redesign.

Second Approach

Figure 6:
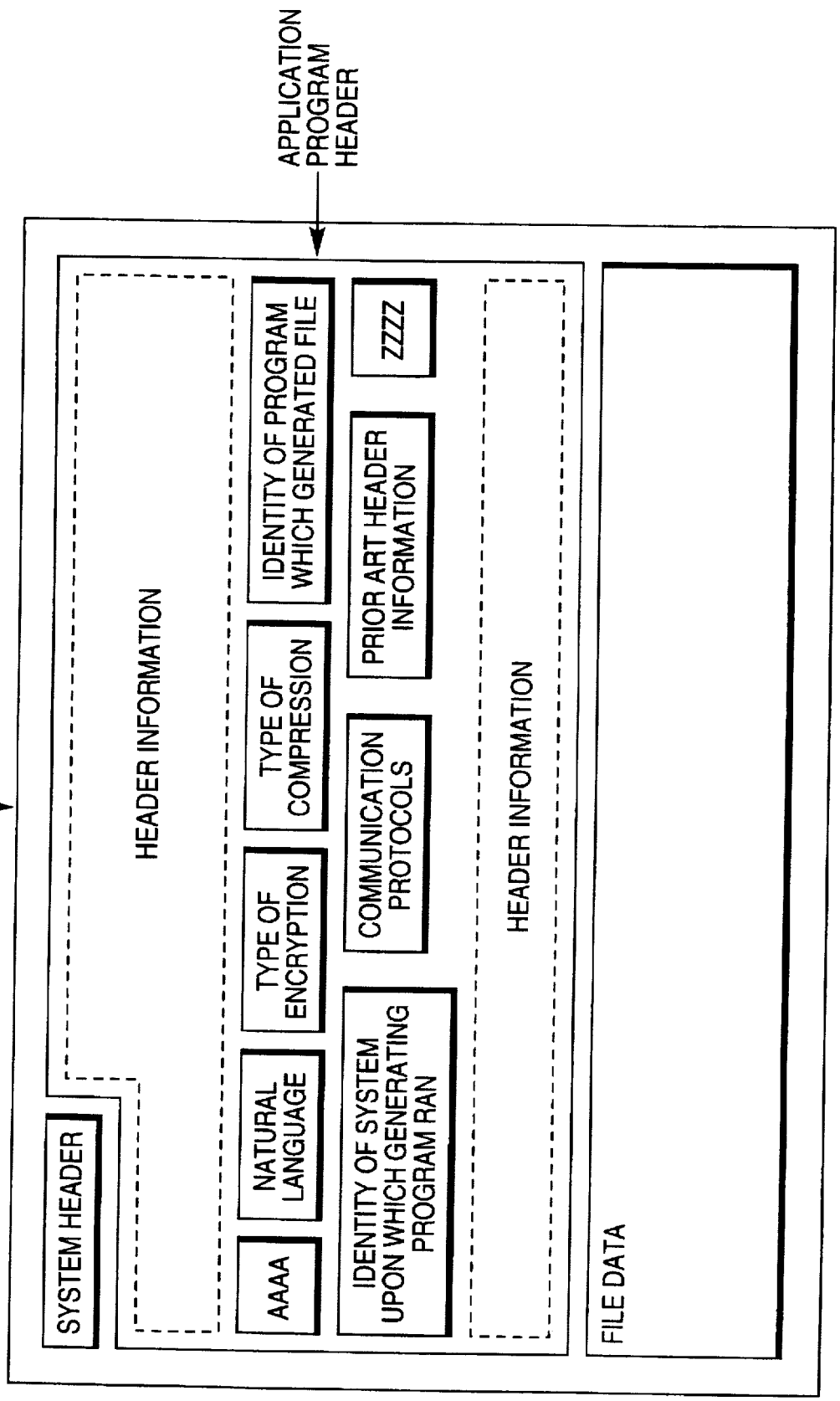
FIG. 6 illustrates another form of the invention.

To avoid this problem, the header of the generating program can be modified to contain an empty region into which a user can insert data, and which the generating program does not use. For example, as shown in FIG. 6, a file contains a SYSTEM HEADER and a header generated by the generating program, labeled APPLICATION PROGRAM HEADER, as usual. In addition, contained within the APPLICATION PROGRAM HEADER are contained two delimiters, such as AAAA and ZZZZ, as indicated. The user is allowed to insert data between these delimiters. In FIG. 6, the six blocks of FIG. 3 have been inserted.

Under this approach, the application program is designed to ignore information contained between these delimiters. How to design the programs to accomplish this is known in the art, once the idea is suggested.

For the invention to use such a file structure, the invention reads the file, in a manner known in the art, and looks for the proper delimiter, which is AAAA in this case. The invention then looks for the NATURAL LANGUAGE block, as by searching for the code NL (see FIG. 5). When this code is found, the invention then reads a next predetermined number of subsequent characters to ascertain the natural language.

Next, the invention looks for the encryption code, EN, in a similar manner, and proceeds until the delimiter ZZZZ is found.

Thus, under this approach, a space is reserved within a header of a file (or elsewhere) into which a fourth party can insert information. The fourth party is, in this case, software associated with the invention.

The party is "fourth" because three other "parties" are involved in inserting data into a file: The application program is considered one party, because it generates the APPLICATION PROGRAM HEADER shown in FIG. 6. The user is considered a second party, because the user generates the FILE DATA. The operating system is considered a third party, because it inserts a system header (not shown herein).

Third Approach

Figure 7:
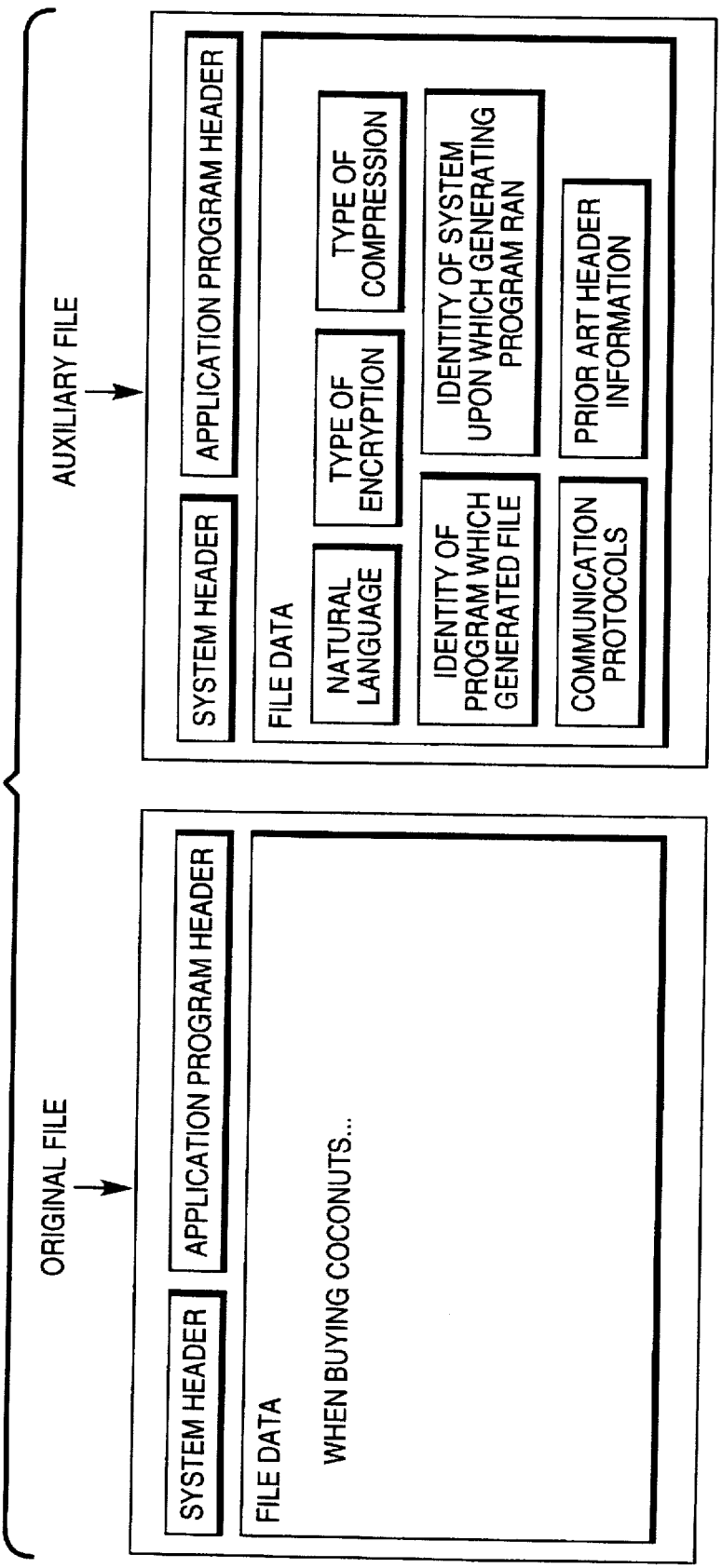
FIG. 7 illustrates yet another form of the invention.

It may not be feasible to expect manufacturers of application programs to allow user data to be inserted or appended as shown in FIG. 6. In such a case, the invention can create an additional file, and associate it with each file created by the application program. FIG. 7 illustrates this association.

The ORIGINAL FILE is that generated by an application program, such as a word-processing program which generated the file "When buying coconuts . . ." as discussed in FIG. 2. The invention generates an AUXILIARY FILE, which contains the information of blocks 1–6 of FIG. 3.

The AUXILIARY FILE of FIG. 7 can be created in numerous different ways, and it can conform to numerous different formats. FIG. 7 shows a format similar to that of the ORIGINAL FILE, in that both contain SYSTEM HEADERs and APPLICATION PROGRAM HEADERs. Other formats are possible.

For tracking purposes, the invention can give the AUXILIARY FILE an identical name as the ORIGINAL FILE, but with a slight modification. For example, if the ORIGINAL FILE is named "COCONUT.DOC", the invention can name the AUXILIARY HEADER as "COCONUT.AUX".

The invention is expected to find significant use within a system described in the Related Applications. This system is available from AT&T Global Information Solutions Company, Dayton, Ohio, under the name "Continuous Learning System," or CLS. Briefly described, CLS stores resources, such as computer files (which include data files, video files, audio files, and so on) at multiple different computer sites, which can be located throughout the world.

A user, who can be located at any of the sites, or linked to CLS via a communication channel, such as a cellular modem, can obtain a catalog of all files contained in the system, to which the user is allowed access. The user can retrieve any file desired.

When a user seeks to retrieve the ORIGINAL FILE shown in FIG. 7, the invention also fetches the AUXILIARY FILE, reads the necessary information, and proceeds accordingly.

That is, when the ORIGINAL FILE is transmitted or copied, the invention always copies the AUXILIARY FILE, which contains the six blocks of data. Restated, the invention assures that, no matter where the ORIGINAL FILE is transported, the AUXILIARY FILE is always in association with it.

For example, if a user, using CLS, retrieves the ORIGINAL FILE and stores it on a diskette, the invention, without the user's knowledge, also retrieves the AUXILIARY FILE, and stores it on the same diskette. The invention may make the AUXILIARY FILE invisible to the user, so that the user does not see the AUXILIARY FILE when the user reads a directory of the diskette, but the information of the six blocks of FIG. 3 are available for the systems of FIG. 4.

Recapitulation

Therefore, irrespective of the particular approach taken, such as that shown in FIG. 3, 5, 6, or 7, the information of blocks 1–6 of FIG. 3 is associated with the ORIGINAL FILE generated by the generating program. The association may be accomplished by writing the data of the six blocks into a separate header of the file, writing the data into an existing header of the file, by creating an AUXILIARY FILE, or by other means.

The six-block information and the ORIGINAL FILE are stored in a repository. If a user seeks to retrieve the ORIGINAL FILE, the invention retrieves it, and also retrieves the six-block information. The six-block information is maintained in association with the ORIGINAL FILE, after retrieval. (That is, within the repository, the ORIGINAL FILE and the AUXILIARY FILE are maintained. Also, at the user's location, the ORIGINAL FILE and the AUXILIARY FILE are now maintained.)

One scenario wherein the invention is to be used is the following: Assume that a document exists in Italy, written in Italian, and generated by word processing program ABC. The invention creates the six blocks of information shown in FIG. 3, and associates them with the file.

If a user in the United States wishes to obtain the file, CLS will retrieve it. CLS maintains a profile for the user, which contains information as to the user's preferred language, preferred wordprocessing program, and other information.

The invention examines the six headers of the file, and learns that (a) the document is written in Italian, and (b) ABC word processor was used to generate it. (The other four headers will be ignored at present.) The invention examines the profile, and learns that the user prefers English, and prefers word processor XYZ.

The invention then calls appropriate translation programs, which translate the document from Italian into English, and from ABC format into XYZ format. The invention generates a new file, based on the selected file. The new file is ready for loading into the user's XYZ word processing program.

The invention undertakes similar activities with respect to the other four blocks.

Definitional Matters

1. When a file is created by an application program, such as a word-processing program, it contains information which is used by three, or more, agents:

a) the system header, which is used by the operating system (first agent);

b) the application program's header, which is used by the application program (second agent); and c) the user data, which is used, or created, by the user (third agent).

One or more of these agents are involved in normal activity involving the file. Normal activity includes a) creating the file (all agents are involved);

b) normal file handling, such as copying, printing, displaying (first agent, or both first and second agents involved); and c) modifying the file (all agents involved).

Since at least one agent is always involved in normal file activity, these agents can be called "essential agents."

In contrast, the agent which creates, or uses, the six blocks of data shown in FIG. 3 is a non-essential agent. The file can be handled in its normal manner, (eg, created or modified) without the involvement of this agent.

Therefore, one definition of "essential agent" is an agent which is required in the normal file-handling activities of a file, or which is an application program which can load the file.

2. The six blocks actually contain signals which are used by the systems of FIG. 4 in calling other programs which transform other data within the file.

Numerous substitutions and modifications can be undertaken without departing from the true spirit and scope of the invention. What is desired to be secured by Letters Patent is the invention as defined in the following claims.

I claim:

1. In a process of writing a computer file to a storage medium, which file is generated by software, the improvement comprising executing steps which include the following information in said file:
   a) signals encoding information which is additional to
      i) system header,
      ii) file header, and
      iii) user data, and
   wherein the signal encoding information is located in the file between the system header and a file header.

2. A computer file carried by a tangible storage medium, comprising:
   a) user data;
   b) at least two headers; and
   c) data useful to a non-essential agent, and the data useful to the non-essential agent being located in the file between the two headers.

3. In a computer file contained in a tangible storage medium, the improvement comprising:
   a) multiple fields, for producing signals which are used by agents other than
      i) those involved in normal file handling, and
      ii) an application program able to load the file, and
   b) the multiple fields being located in the file between a field used for normal file handling and a header for the multiple fields.

4. In a process of writing a computer file to a storage medium, said computer file containing a header generated by an application program, the improvement comprising:
   a) creating, in said computer file, space for information including a second header to be used by an agent other than
      i) an operating system and
      ii) the application program, and
   b) locating the space between the information between the header for the application program and the second header.

5. In a computer-readable file having file data and being contained in a tangible storage medium, the improvement comprising:
   a) means for indicating at least two of the following:
      i) natural language of the file;
      ii) type of encryption of the file;
      iii) type of compression of the file;
      iv) identity of the program which generated the file;
      v) identity of the operating system upon which the generating program ran; and
      vi) communication protocol information, and locating the indicating means ahead of the file data and between a header for the indicating means and a header for the file data.

6. A method of processing a computer file having file data, comprising the following steps:
   a) maintaining, in association with the file, information indicative of at least two of the following:
      i) natural language of the file;
      ii) type of encryption of the file;
      iii) type of compression of the file;
      iv) identity of the program which generated the file, which program runs on an operating system;
      v) identity of the operating system upon which the generating program ran; and
      vi) communication protocol required by the file;
   b) locating the information indicative of at least two of i) through vi) between a header for the system and a file header for the file data; and
   c) reading said information and calling respective programs which process the file in accordance with the information, without human intervention.

7. In a process of writing a computer file to a storage medium, which file is generated by software, the improvement comprising executing steps which include the following information in said file:
   a) signals encoding information which is additional to
      i) system header,
      ii) file header,
      iii) user data, and
   wherein the signal encoding information is located in an auxiliary file to a file for the system header, file header and user data; the auxiliary file also including the system header and the file header.

8. A process of claim 7 wherein the file and the auxiliary file are retrievable together.

9. A process of claim 7 wherein the auxiliary file is invisible to a user.

10. A computer file carried by a tangible storage medium, comprising:
    a) user data;
    b) at least two headers; and
    c) data useful to a non-essential agent, and the data useful to the non-essential agent is located in an auxiliary file, the auxiliary file including the at least two headers.

11. A computer file of claim 10 wherein the file and the auxiliary file are retrievable together.

12. A computer file of claim 10 wherein the auxiliary file is invisible to a user.

13. In a computer file contained in a tangible storage medium, the improvement comprising:
    a) multiple fields, for producing signals, which are used by agents other than
       i) those involved in normal file handling, and
       ii) an application program able to load the file, and
    b) the multiple fields being located in an auxiliary file, the auxiliary file being related to the field for normal file handling.

14. A computer file of claim 13 wherein the file and the auxiliary file are retrievable together.

15. A computer file of claim 13 wherein the auxiliary file is invisible to a user.

16. In a process of writing a computer file to a storage medium, said computer file containing a first header generated by an application program, the improvement comprising:
    a) creating, in said computer file, space for information including a second header to be used by an agent other than
       i) an operating system
       ii) the application program, and
    b) locating the space in an auxiliary file, the auxiliary file including the first and the second header.

17. A process of claim 16 wherein the file and the auxiliary file are retrievable together.

18. A process of claim 16 wherein the auxiliary file is invisible to a user.

19. In a computer-readable file having file data and being contained in a tangible storage medium, the improvement comprising:
    a) means for indicating at least two of the following:
       i) natural language of the file;
       ii) type of encryption of the file;
       iii) type of compression of the file;

iv) identity of the program which generated the file;

v) identity of the operating system upon which the generating program ran; and vi) communication protocol information, and locating the indicating means in an auxiliary file, the auxiliary file having a header relating the means to the file data.

20. A file as claimed in claim 19 wherein the file and the auxiliary file are retrievable together.

21. A file as claimed in claim 19 wherein the auxiliary file is invisible to a user.

22. A method of processing a computer file, having file data, comprising the following steps:

a) maintaining, in association with the file, information indicative of at least two of the following:

i) natural language of the file;

ii) type of encryption of the file;

iii) type of compression of the file;

iv) identity of the program which generated the file, which program runs on an operating system;

v) identity of the operating system upon which the generating program ran; and vi) communication protocol required by the file;

b) locating the information indicative of at least two of i) through vi) in an auxiliary file, the auxiliary file including a header for the system and a file header for the file data, and c) reading said information and calling respective programs which process the file in accordance with the information, without human intervention.

23. A method as claimed in claim 22 wherein the file and the auxiliary file are retrievable together.

24. A method as claimed in claim 22 wherein the auxiliary file is invisible to a user.

* * * * *